United States Patent
Xie (10) Patent No.: US 12,353,895 B2
(45) Date of Patent: Jul. 8, 2025

(54) SCREEN-OFF DISPLAY METHOD AND APPARATUS

(71) Applicant: VIVO MOBILE COMMUNICATION CO., LTD., Dongguan (CN)

(72) Inventor: Qingyu Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 85 days.

(21) Appl. No.: 18/226,240

(22) Filed: Jul. 25, 2023

(65) Prior Publication Data

US 2023/0385082 A1  Nov. 30, 2023

Related U.S. Application Data (63) Continuation of application No. PCT/CN2022/072931, filed on Jan. 20, 2022.

(30) Foreign Application Priority Data

Jan. 26, 2021 (CN) .......................... 202110106656.1

(51) Int. Cl.
*G06F 9/451* (2018.01)
*G06F 1/3234* (2019.01)
*H04W 52/02* (2009.01)

(52) U.S. Cl.
CPC ............ *G06F 9/451* (2018.02); *G06F 1/3265* (2013.01); *H04W 52/027* (2013.01)

(58) Field of Classification Search
CPC ..... G06F 9/451; G06F 1/3265; H04W 52/027
See application file for complete search history.

(56) References Cited

U.S. PATENT DOCUMENTS

2007/0240055 A1* 10/2007 Ting ..................... G06F 21/32
715/704
2010/0205566 A1  8/2010 Matoba
(Continued)

FOREIGN PATENT DOCUMENTS

CN  106502533 A  3/2017
CN  107491280 A  12/2017
(Continued)

OTHER PUBLICATIONS

Lu, Yan, Shipeng Li, and Huifeng Shen. "Virtualized screen: A third element for cloud-mobile convergence." Ieee Multimedia 18.2 ( 2011): 4-11 (Year: 2011).*
(Continued)

*Primary Examiner* — Shahid K Khan
(74) *Attorney, Agent, or Firm* — IPX PLLC (57) ABSTRACT

A screen-off display method and apparatus are provided. The screen-off display method includes: receiving a first input, where the first input is an input that triggers an electronic device to be in a screen-off state; and in response to the first input, turning off a screen of the electronic device and displaying a first screen-off display content on the turned-off screen, where the first screen-off display content is a content in a target application, the target application is a source application of a screen-off display content preset by a user in the electronic device, and the content in the target application is updated in real time after the screen of the electronic device is turned off.

15 Claims, 4 Drawing Sheets

(56) References Cited

U.S. PATENT DOCUMENTS

| | | | | |
|---|---|---|---|---|
| 2012/0293477 | A1* | 11/2012 | Ni | G06F 1/32 345/211 |
| 2015/0199102 | A1* | 7/2015 | Koh | G06F 3/041661 715/835 |

FOREIGN PATENT DOCUMENTS

| | | | | |
|---|---|---|---|---|
| CN | 108154864 | A * | 6/2018 | G06F 3/013 |
| CN | 109361593 | A | 2/2019 | |
| CN | 109460177 | A | 3/2019 | |
| CN | 110287741 | A | 9/2019 | |
| CN | 110362366 | A * | 10/2019 | |
| CN | 110489199 | A | 11/2019 | |
| CN | 111026484 | A * | 4/2020 | G06F 3/1454 |
| CN | 111049979 | A * | 4/2020 | G06F 3/1415 |
| CN | 111049980 | A | 4/2020 | |
| CN | 111160097 | A | 5/2020 | |
| CN | 111752451 | A | 10/2020 | |
| CN | 111831378 | A | 10/2020 | |
| CN | 111857913 | A | 10/2020 | |
| CN | 112055243 | A | 12/2020 | |
| CN | 112114721 | A | 12/2020 | |
| CN | 112181560 | A * | 1/2021 | |
| CN | 112764624 | A | 5/2021 | |
| WO | WO-2016070848 | A1 * | 5/2016 | G06F 3/1454 |
| WO | WO-2019206091 | A1 * | 10/2019 | G06F 3/04817 |

OTHER PUBLICATIONS

International Search Report issued in corresponding International Application No. PCT/CN2022/072931, mailed Mar. 30, 2022, 5 pages.

First Office Action issued in corresponding CN Patent Application No. 202110106656.1, dated Dec. 21, 2021, 6 pages.

Second Office Action issued in corresponding CN Patent Application No. 202110106656.1, dated May 16, 2022, 6 pages.

* cited by examiner

SCREEN-OFF DISPLAY METHOD AND APPARATUS

CROSS-REFERENCE TO RELATED APPLICATIONS

This application is a continuation of International Application No. PCT/CN2022/072931, filed on Jan. 20, 2022, which claims priority to Chinese Patent Application No. 202110106656.1, filed on Jan. 26, 2021. The entire contents of each of the above-identified applications are expressly incorporated herein by reference.

TECHNICAL FIELD

This application pertains to the field of communications technologies, and in particular, to a screen-off display method and apparatus.

BACKGROUND

Currently, most electronic devices have the function of screen-off display, that is, the electronic device can display some contents of the electronic device on a turned-off screen in a screen-off condition (hereinafter referred to as a screen-off display content), Specifically, the electronic device can display some notification information and reminder messages on the turned-off screen, such as time information, date information, message notification, alarm clock reminder, charging reminder, and the like.

However, the screen-off display contents mentioned above are all preset in the electronic device by a manufacturer of the electronic device, and the screen-off display contents can include only some notification information and reminder messages. Therefore, the screen-off display contents of the electronic device are not flexible enough.

SUMMARY

This application provides a screen-off display method and apparatus.

According to a first aspect, an embodiment of this application provides a screen-off display method, and the method includes: receiving a first input, where the first input is an input that triggers an electronic device to be in a screen-off state; and in response to the first input, turning off a screen of the electronic device and displaying a first screen-off display content on the turned-off screen, where the first screen-off display content is a content in a target application, the target application is a source application of a screen-off display content preset by a user in the electronic device, and the content in the target application is updated in real time after the screen of the electronic device is turned off.

According to a second aspect, an embodiment of this application provides a screen-off display apparatus, and the screen-off display apparatus includes: a receiving module, an execution module, and a display module; the receiving module is configured to receive a first input, where the first input is an input that triggers an electronic device to be in a screen-off state; the execution module is configured to: in response to the first input received by the receiving module, turn off a screen of the electronic device; and the display module is configured to display a first screen-off display content on the turned-off screen of the execution module, where the first screen-off display content is a content in a target application, the target application is a source application of a screen-off display content preset by a user in the electronic device, and the content in the target application is updated in real time after the screen of the electronic device is turned off.

According to a third aspect, an embodiment of this application provides an electronic device. The electronic device includes a processor, a memory, and a program or an instruction stored in the memory and executable on the processor, where when the program or the instruction is executed by the processor, steps of the screen-off display method in the first aspect are implemented.

According to a fourth aspect, an embodiment of this application provides a readable storage medium. The readable storage medium stores a program or an instruction, and when the program or the instruction is executed by a processor, steps of the screen-off display method in the first aspect are implemented.

According to a fifth aspect, an embodiment of this application provides a chip. The chip includes a processor and a communications interface, where the communications interface is coupled to the processor, and the processor is configured to run a program or an instruction to implement steps of the screen-off display method in the first aspect.

In the embodiments of this application, a first input is received, where the first input is an input that triggers an electronic device to be in a screen-off state; and in response to the first input, a screen of the electronic device is turned off, and a first screen-off display content is displayed on the turned-off screen, where the first screen-off display content is a content in a target application, the target application is a source application of a screen-off display content preset by a user in the electronic device, and the content in the target application is updated in real time after the screen is turned off. On the one hand, because the target application is the source application of the screen-off display content preset by the user in the electronic device, the user can set, according to actual use requirements, a content that the user wants to view after the screen of the electronic device is turned off. On the other hand, because the content in the target application is updated in real time after the screen of the electronic device is turned off, the content in the target application can be viewed in real time on the turned-off screen of the electronic device. In this way, through the screen-off display method provided in this embodiment of this application, the content displayed on the electronic device in a screen-off condition can be more flexible.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

The terms "first," "second," and the like in the description and the claims of this application are used to distinguish between similar objects instead of describing a specific order or sequence. It should be understood that, data used in such a way is interchangeable in proper circumstances, so that the embodiments of this application can be implemented in an order other than the order illustrated or described herein. Objects classified by "first," "second," and the like are usually of a same type, and the quantity of objects is not limited. For example, there may be one or more first objects. In addition, in the specifications and the claims, "and/or" represents at least one of connected objects, and a character "/" generally represents an "or" relationship between associated objects.

In the embodiments of this application, words such as "exemplary" or "for example" are used to indicate an example, an instance, or descriptions. Any embodiment or design scheme described as "an example of" or "for example" in the embodiments of this application should not be explained as being more preferred or having more advantages than another embodiment or design scheme. To be precise, the use of the term such as "exemplary" or "for example" is intended to present a related concept in a specific manner.

With reference to the accompanying drawings, the screen-off display method provided in the embodiments of this application is described in detail by using specific embodiments and application scenarios thereof.

Figure 1:
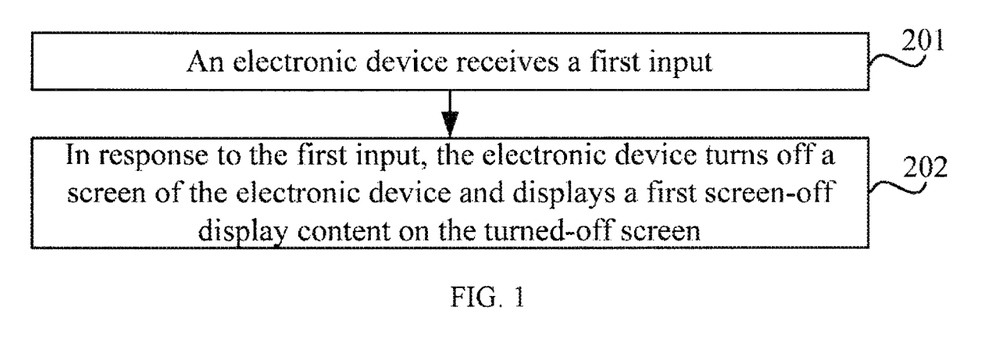
FIG. 1 is a flowchart of a screen-off display method according to an embodiment of this application.

As shown in FIG. 1, an embodiment of this application provides a screen-off display method. The method includes step 201 and step 202.

It should be noted that, the screen-off display method provided in this embodiment of this application may be performed by a screen-off display apparatus or a control module that is in the screen-off display apparatus and that is configured to perform the screen-off display method, or may be performed by an electronic device. The electronic device is used as an example below to describe the screen-off display method provided in this embodiment of this application.

In this embodiment of this application, when an execution entity of the screen-off display method provided in this embodiment of this application is an electronic device, the electronic device may include a screen-off display apparatus provided in this embodiment of this application, or may be externally connected to the screen-off display apparatus. This may be specifically determined according to an actual use requirement, and is not limited in this embodiment of this application.

Step 201. An electronic device receives a first input.

The first input may be an input that triggers an electronic device to be in a screen-off state.

Step 202. In response to the first input, the electronic device turns off a screen of the electronic device and displays a first screen-off display content on the turned-off screen.

The first screen-off display content may be a content in a target application, the target application may be a source application of a screen-off display content preset by a user in the electronic device, and the content in the target application is updated in real time after the screen of the electronic device is turned off.

It can be understood that the target application is an application that provides the screen-off display content.

In this embodiment of this application, when the electronic device receives the first input that triggers the electronic device to be in the screen-off state, in response to the first input, the electronic device may turn off the screen of the electronic device and displays the first screen-off display content on the turned-off screen.

In this embodiment of this application, the target application may be a third-party application in the electronic device.

For example, the target application can be a wealth management application, a news application, a chat application, or other applications where the user needs to pay attention to information in real time in the electronic device. This may be specifically determined according to an actual use requirement, and is not limited in this embodiment of this application.

Figure 2:
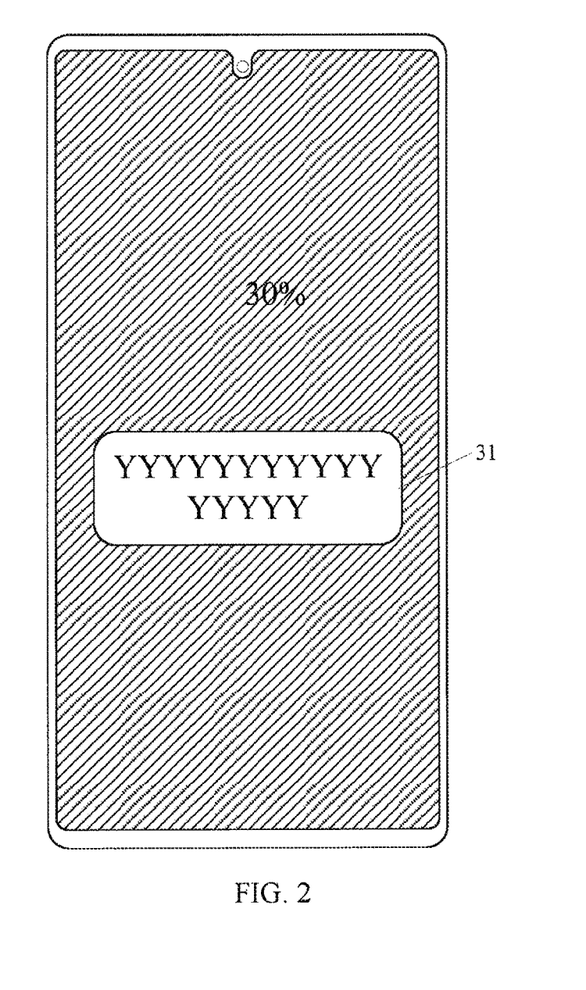
FIG. 2 is a first schematic diagram of an interface to which a screen-off display method is applied according to an embodiment of this application.

For example, it is assumed that the target application is the wealth management application, and after the electronic device turns off the screen of the electronic device, the electronic device can turn off the screen of the electronic device and display a screen-off display content 31, as shown in FIG. 2, on the turned-off screen, that is, the first screen-off display content.

This embodiment of this application provides a screen-off display method. On the one hand, because the target application is the source application of the screen-off display content preset by the user in the electronic device, the user can set, according to actual use requirements, a content that the user wants to view after the screen of the electronic device is turned off; and on the other hand, because the content in the target application is updated in real time after the screen of the electronic device is turned off, the content in the target application can be viewed in real time on the turned-off screen of the electronic device. In this way, through the screen-off display method provided in this embodiment of this application, the content displayed on the electronic device in a screen-off condition can be more flexible.

In this embodiment of this application, before receiving the first input, the electronic device can run the target application in a virtual screen of the electronic device, so that a content in a target interface can still be updated in real time after the screen of the electronic device is turned off.

In some implementations, before step 201, the screen-off display method provided in this embodiment of this application may further include the following step 203.

Step 203. The electronic device runs the target application in the virtual screen of the electronic device to update the content in the target application in real time.

In this embodiment of this application, before receiving the first input, the electronic device can run the target application in the virtual screen of the electronic device, so that the target application can still be updated in real time after the screen of the electronic device is turned off.

In some implementations, after the electronic device is unlocked, the electronic device can run the target application in the virtual screen of the electronic device.

In some implementations, the target application can run in the virtual screen of the electronic device in a foreground running state, so that a running process of the target application can be prevented from being shut down.

In some implementations, when the target application includes a plurality of applications, each of the plurality of applications can run in a different virtual screen of the electronic device. That is, the electronic device can start a plurality of virtual screens to run the plurality of applications.

In this embodiment of this application, since a running state of a virtual screen system of the electronic device is independent of a screen state of the electronic device, by running the target application in the virtual screen of the electronic device before the electronic device turns off the screen of the electronic device, it can be ensured that the target application can still run after the electronic device turns off the screen, so that the target application can be updated in real time.

In some implementations, when the content, in the target application is a content in a target interface of the target application, before the electronic device turns off the screen of the electronic device and displays the first screen-off display content on the turned-off screen, the electronic device can acquire an image of the target interface to obtain a screenshot image (for example, a first screenshot image in this embodiment of this application), so that the electronic device can display the screenshot image after the screen of the electronic device is turned off, so as to display the first screen-off display content.

In some implementations, step 202 may be specifically implemented by using the following step 202a to step 202c.

Step 202a. In response to the first input, the electronic device acquires the image of the target interface to obtain a first screenshot image.

Step 202b. The electronic device turns off the screen of the electronic device.

Step 202c. The electronic device displays the first screenshot image on the turned-off screen.

It should be noted that, in this embodiment of this application, "acquiring the image of the target interface to obtain a first screenshot image" in step 202a, step 202b, and step 202c are all steps executed by the electronic device in response to the first input. In order to clearly show an execution order among these steps, this embodiment of this application only describes "the electronic device is in response to the first input" in step 202a.

In this embodiment of this application, after the electronic device receives the first input, the electronic device can acquire the image of the target interface, so as to obtain the first screenshot image. In this way, after the screen of the electronic device is turned off, the electronic device can display the first screenshot image on the turned-off screen, thereby displaying the first screen-off display content.

In some implementations, the electronic device can acquire the image of the target interface by taking a screen shot of the target interface. Certainly, in actual implementation, the electronic device can also acquire the image of the target interface through any other possible implementations, which can be specifically determined according to the actual use requirements. This is not limited in this embodiment of this application.

In this embodiment of this application, the electronic device can project the first screenshot image onto the turned-off screen of the electronic device.

In some implementations, when the first screen-off display content is a content in a target area of the target interface, before step 202c, the screen-off display method provided in this embodiment of this application may further include the following step 204. The foregoing step 202c may be specifically implemented by the following step 202c1.

Step 204, The electronic device performs a target operation on the first screenshot image to obtain a target image.

Step 202c1. The electronic device displays the target image on the turned-off screen.

The foregoing target operation may be any one of the following: acquiring an image corresponding to the target area in screenshot images; and covering an image other than the image corresponding to the target area in screenshot images.

In this embodiment of this application, when the first screen-off display content is the content in the target area of the target interface, after the electronic device obtains the first screenshot image, the electronic device can perform the target operation on the first screenshot image, so as to obtain the target image. Then, the target image is displayed on the turned-off screen.

In this embodiment of this application, when the target operation is to acquire the image corresponding to the target area in screenshot images, the electronic device can capture a full-screen image (namely, acquire the first screenshot image), and then perform another screenshot on the screenshot image based on the target area, so that the image corresponding to the target area can be captured, so as to obtain the target image. In addition, the target image is sent to a screen-off display module of the electronic device, so that the electronic device can display the target image on the turned-off screen (namely, display the content in the target area on the turned-off screen).

In this embodiment of this application, when the target operation is to cover the image other than the image corresponding to the target area in screenshot images, the electronic device can capture a full-screen image (namely, the first screenshot image) and send the first screenshot image to the screen-off display module of the electronic device. The screen-off display module can selectively cover the image based on the target area, for example, blackening the image other than the image corresponding to the target area in the first screenshot image, so that only the image corresponding to the target area in the first screenshot image displayed on the turned-off screen is visible to the user, that is, the content in the target area is displayed on the turned-off screen.

In some implementations, after the screen-off display module of the electronic device receives the image, the screen-off display module can perform target processing on the image, such as dark color processing, so that power consumption can be reduced.

In some implementations, because the target application runs in the virtual screen system of the electronic device, the target application still runs even if the screen of the electronic device is turned off. In this way, after the electronic device displays the first screenshot image on the turned-off screen, the electronic device can re-acquire the image of the target interface every interval of time (such as the preset duration in this embodiment of this application), thereby obtaining the image of the target interface updated in real time (for example, the second screenshot image in this embodiment of this application), and update the image displayed on the turned-off screen with the second screenshot image, so that the content displayed on the turned-off screen of the electronic device can be updated in real time.

In some implementations, after step 202c, the screen-off display method provided in this embodiment of this application may further include the following step 205 and step 206.

Step 205. The electronic device re-acquires the image of the target interface every preset duration to obtain a second screenshot image.

Step 206. The electronic device updates an image displayed on the turned-off screen with the second screenshot image.

In this embodiment of this application, the electronic device can re-acquire the image of the target interface every preset duration, so as to obtain the second screenshot image, and after obtaining the second screenshot image, the electronic device can update the image displayed on the turned-off screen of the electronic device with the second screenshot image.

It should be noted that in this embodiment of this application, for a specific manner in which the electronic device re-acquires the image of the target interface, refer to the implementation in which the electronic device acquires the image of the target interface in the foregoing embodiment. To avoid repetition, details are not described herein again.

In some implementations, the preset duration may be duration preset in the electronic device by a manufacturer of the electronic device, for example, any possible duration such as 5 seconds or 10 seconds. This may be specifically determined according to an actual use requirement, and is not limited in this embodiment of this application.

In some implementations, before the electronic device receives the first input, the user may set, according to usage requirements of the user, the target area as a source area of a screen-off display content of the electronic device.

In some implementations, before step 201, the screen-off display method provided in this embodiment of this application may further include the following step 207 to step 210.

Step 207. The electronic device receives a second input when the target interface is displayed.

Step 208. The electronic device displays a target selection control in response to the second input.

Step 209. The electronic device receives a third input to the target selection control.

The third input is used to trigger selection of the target area.

Step 210. In response to the third input, the electronic device sets the target area as the source area of the screen-off display content of the electronic device.

In this embodiment of this application, when the electronic device displays the target interface, the user can trigger the electronic device to display the target selection control through the second input, so that the user can trigger the electronic device to select the target area through the third input to the target selection control, so as to set the target area as the source area of the screen-off display content of the electronic device.

In some implementations, the target selection control may include two sub-controls, namely, a first sub-control and a second sub-control, where the first sub-control is a control for determining full-screen selection or area selection, and the second sub-control is a control for selecting an area.

Figure 3:
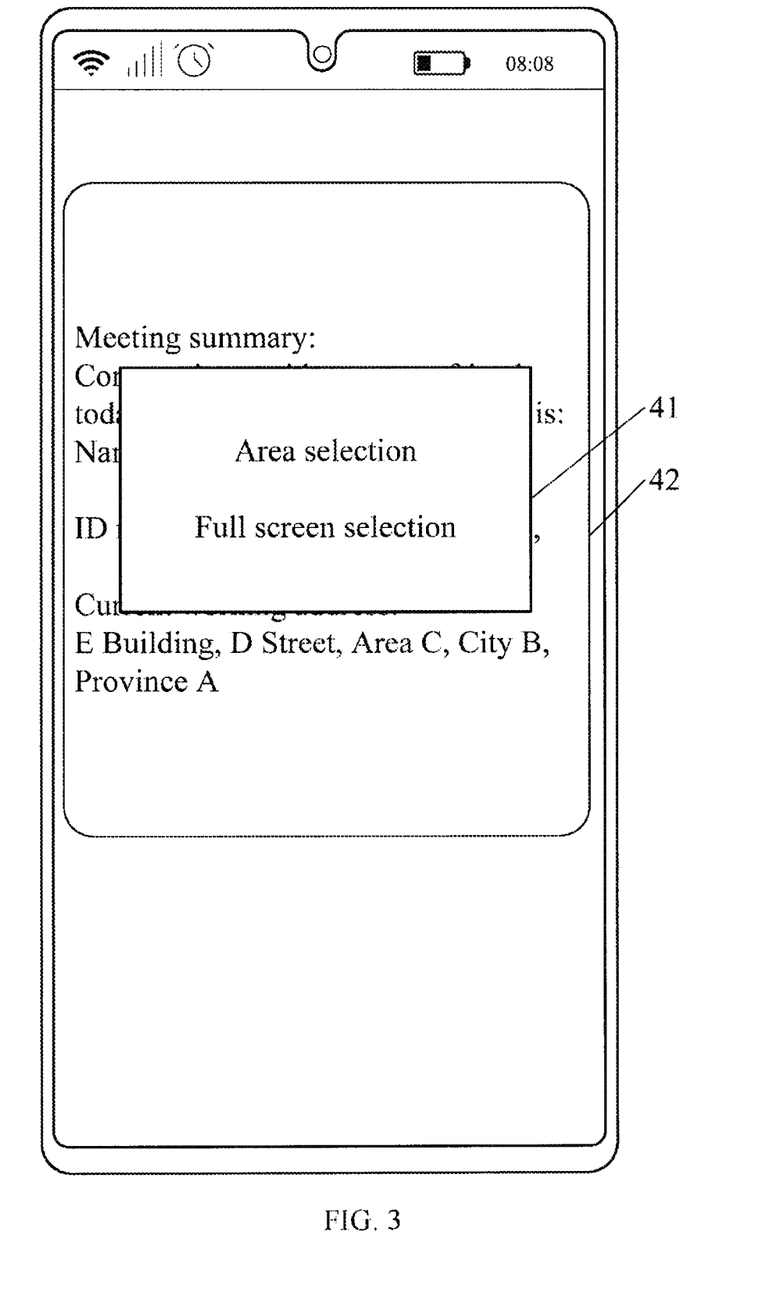
FIG. 3 is a second schematic diagram of an interface to which a screen-off display method is applied according to an embodiment of this application.

For example, after receiving the second input, the electronic device may display the first sub-control 41 and the second sub-control 42 as shown in FIG. 3. If the user clicks a "full screen selection" option in the first sub-control 41, the electronic device can use the current display interface (namely, the target interface) as the target area, that is, the content in this interface is used as the screen-off display content. If the user clicks "area selection" in the first sub-control 41, the user can select the area corresponding to the screen-off display content by using an input to a dotted box (namely, the second sub-control 42) in the figure.

In some implementations, both a size and a shape of the second sub-control can be adjusted.

In some implementations, the user can also select the target area in the target interface through artificial intelligence (artificial intelligence, AI) identification.

It can be understood that in this embodiment of this application, after the target area is selected, the electronic device can save a size and a location of the target area.

In some implementations, the user can trigger the electronic device to cancel setting the target area as the source area of the screen-off display content of the electronic device through a fifth input.

In some implementations, the fifth input may be a preset gesture input or an input in a shortcut menu bar. This may be specifically determined according to an actual use requirement, and is not limited in this embodiment of this application.

In some implementations, before receiving the first input, the user can set, on an editing interface of a screen-off display location in the electronic device, a display location of the content of the target application on the turned-off screen of the electronic device.

In some implementations, before step 201, the screen-off display method provided in this embodiment of this application may further include the following step 211 to step 213. The foregoing step 202 may be specifically implemented by the following step 202d.

Step 211. The electronic device displays a screen-off display location editing interface.

The screen-off display location editing interface can be used to set a display location of the screen-off display content on the turned-off screen of electronic device.

Step 212. The electronic device receives a fourth input to an identifier of the target application in the screen-off display location editing interface.

Step 213. In response to the fourth input, the electronic device sets the display location of the content in the target application on the turned-off screen as a target display location.

The target display location may be associated with an input parameter of the fourth input.

Step 202d. In response to the first input, the electronic device turns off the screen of the electronic device and displays the first screen-off display content on the target display location of the turned-off screen.

In this embodiment of this application, before the electronic device receives the first input, the electronic device can display the screen-off display location editing interface, and then the user can trigger, through the fourth input to the identifier of the target application in the screen-off display location editing interface, the electronic device to set the target display location as the display location of the content in the target application on the turned-off screen of the electronic device. In this way, after the electronic device turns off the screen of the electronic device, the electronic device can display the first screen-off display content on the target display location of the turned-off screen.

In some implementations, the identifier of the target application may be an icon of the target application, or a name of the target application, or the like. This may be specifically determined according to an actual use requirement, and is not limited in this embodiment of this application.

In some implementations, the fourth input may be to drag the identifier of the target application to a location in which the screen-off display location editing interface is corresponding to the target display location.

In some implementations, when the target application includes a plurality of applications, the user can drag an identifier of each of the plurality of applications to a desired location according to use requirements thereof.

It can be understood that when the target application includes a plurality of applications, the electronic device can display contents of different applications at different locations in the turned-off screen of the electronic device.

In some implementations, after the electronic device receives a sixth input that triggers the electronic device to display a lock screen, the electronic device can display the first screen-off display content on the lock screen in response to the sixth input.

The screen-off display apparatus provided in the embodiments of this application is described below by using an example in which the screen-off display method is performed by the screen-off display apparatus.

Figure 4:
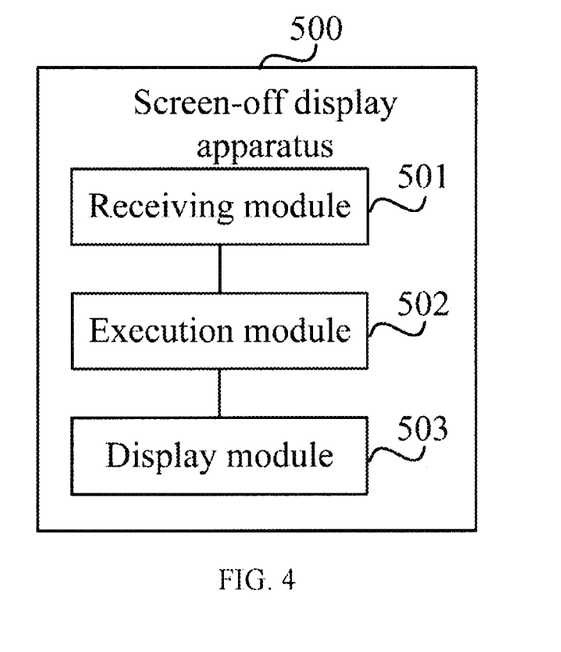
FIG. 4 is a schematic diagram of a structure of a screen-off display apparatus according to an embodiment of this application.

As shown in FIG. 4, an embodiment of this application provides a screen-off display apparatus 500. The screen-off display apparatus 500 includes a receiving module 501, an execution module 502, and a display module 503. The receiving module 501 is configured to receive a first input, where the first input is an input that triggers an electronic device to be in a screen-off state; the execution module 502 is configured to: in response to the first input received by the receiving module 501, turn off a screen of the electronic device; and the display module 503 is configured to display a first screen-off display content on the turned-off screen of the execution module 502, where the first screen-off display content is a content in a target application, the target application is a source application of a screen-off display content preset by a user in the electronic device, and the content in the target application is updated in real time after the screen of the electronic device is turned off.

In some implementations, the execution module is further configured to: before the receiving module receives the first input, run the target application in a virtual screen of the electronic device to update the content in the target application in real time.

According to the screen-off display apparatus in this embodiment of this application, since a running state of a virtual screen system of the electronic device is independent of a screen state of the electronic device, by running the target application in the virtual screen of the electronic device before the screen of the electronic device is turned off, it can be ensured that the target application can still run after the electronic device turns off the screen, so that the target application can be updated in real time.

In some implementations, the content in the target application is a content in a target interface of the target application, the execution module is further configured to: before the display module displays the first screen-off display content on the turned-off screen, acquire an image of the target interface to obtain a first screenshot image; and the display module is specifically configured to display the first screenshot image on the turned-off screen.

In some implementations, the first screen-off display content is a content in a target area of the target interface; the execution module is further configured to: before the display module displays the first screenshot image on the turned-off screen, perform a target operation on the first screenshot image to obtain a target image; and the display module is specifically configured to display the target image on the turned-off screen, where the target operation is any one of the following: acquiring an image corresponding to the target area in screenshot images; and covering an image other than the image corresponding to the target area in screenshot images.

In some implementations, the execution module is further configured to: after the display module displays the first screenshot image on the turned-off screen, re-acquires the image of the target interface every preset duration to obtain a second screenshot image; and the display module is further configured to update an image displayed on the turned-off screen with the second screenshot image.

In some implementations, the screen-off display apparatus further includes a setting module, where the receiving module is further configured to: before receiving the first input, receive a second input when the target interface is displayed; the display module is further configured to: in response to the second input received by the receiving module, display a target selection control; the receiving module is further configured to: receive a third input to the target selection control displayed by the display module, where the third input is used to trigger selection of the target area; and the setting module is configured to: in response to the third input received by the receiving module, set the target area as a source area of a screen-off display content of the electronic device.

In some implementations, the screen-off display apparatus further includes a setting module; the display module is further configured to display a screen-off display location editing interface before the receiving module receives the first input, where the screen-off display location editing interface is used to set a display location of the screen-off display content on the turned-off screen; the receiving module is further configured to receive a fourth input to an identifier of the target application in the screen-off display location editing interface displayed by the display module; the setting module is configured to: in response to the fourth input received by the receiving module, set the display location of the content in the target application on the turned-off screen as a target display location, where the target display location is associated with an input parameter of the fourth input; and the display module is specifically configured to display the first screen-off display content on the target display location of the turned-off screen.

This embodiment of this application provides a screen-off display apparatus. On the one hand, because the target application is the source application of the screen-off display content preset by the user in the electronic device, the user can set, according to actual use requirements, a content that the user wants to view after the screen of the electronic device is turned off; and on the other hand, because the content in the target application is updated in real time after the screen of the electronic device is turned off, the content in the target application can be viewed in real time on the turned-off screen of the electronic device. In this way, the content displayed on the electronic device in a screen-off condition can be more flexible.

The screen-off display apparatus in this embodiment of this application can be an apparatus, or a component, an integrated circuit, or a chip in an electronic device. The apparatus may be a mobile electronic device, or may be a non-mobile electronic device. For example, the mobile electronic device may be a mobile phone, a tablet computer, a notebook computer, a palmtop computer, a vehicle-mounted terminal device, a wearable device, an Ultra-Mobile Personal Computer (UMPC), a netbook, or a Personal Digital Assistant (PDA), and the non-mobile terminal device may be a personal computer, a television, a counter, or a self-service computer. This is not specifically limited in this embodiment of this application.

The screen-off display apparatus in the embodiments of this application may be an apparatus with an operating system. The operating system may be an Android operating system, an iOS operating system, or another possible operating system, which is not specifically limited in this embodiment of this application.

The screen-off display apparatus provided in the embodiments of this application can implement the processes that are implemented in the foregoing method embodiments. To avoid repetition, details are not described herein again.

Figure 5:
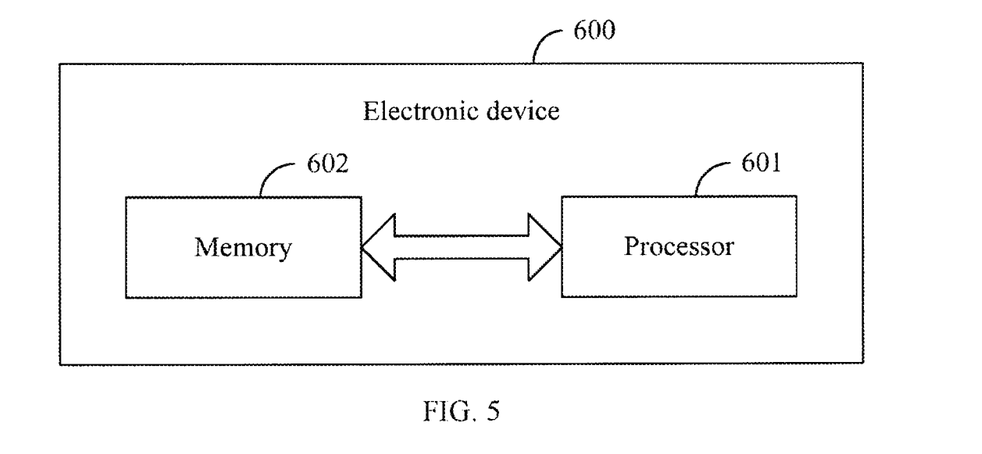
FIG. 5 is a schematic diagram of a structure of an electronic device according to an embodiment of this application.

In some implementations, as shown in FIG. 5, an embodiment of this application further provides an electronic device 600, including a processor 601, a memory 602, and a program or an instruction stored in the memory 602 and executable on the processor 601. When the program or the instruction is executed by the processor 601, the processes of the foregoing screen-off display method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 6:
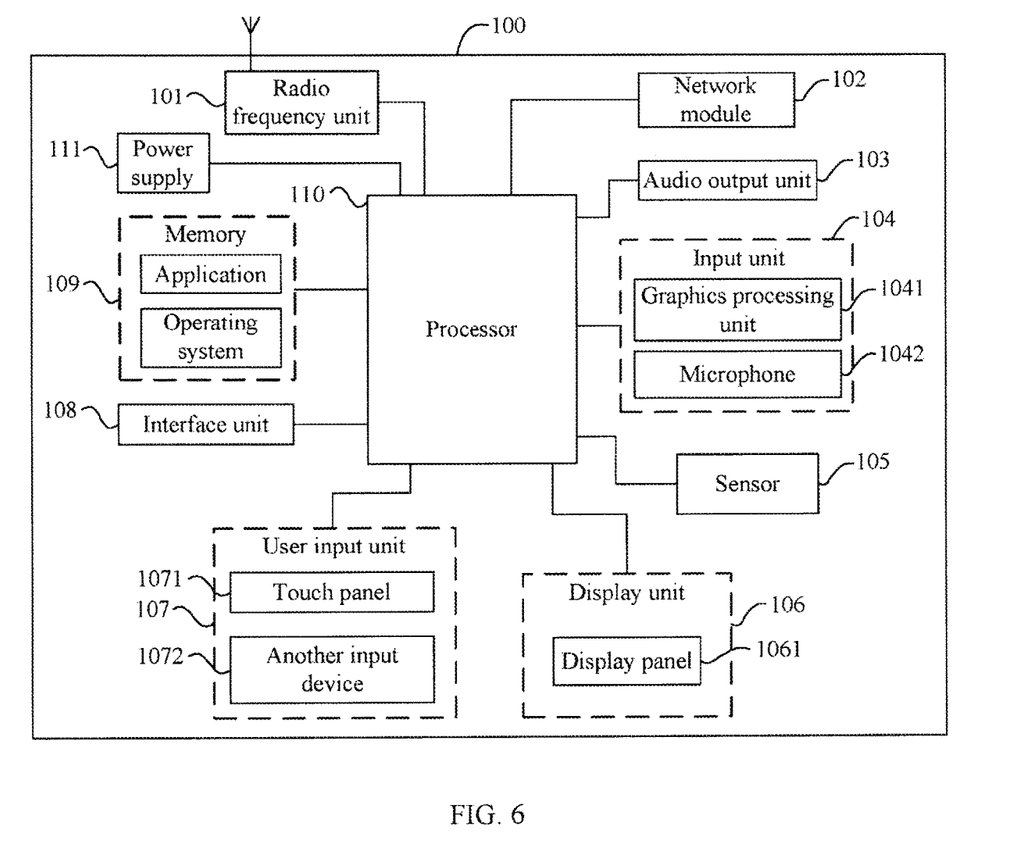
FIG. 6 is a schematic diagram of hardware of an electronic device according to an embodiment of this application.

FIG. 6 is a schematic diagram of a hardware structure of an electronic device for implementing embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It may be understood by a person skilled in the art that the electronic device 100 may further include a power supply 111 (such as a battery) that supplies power to each component. The power supply may be logically connected to the processor 110 by using a power management system, to implement functions such as charging, discharging, and power consumption management by using the power management system. A structure of the electronic device shown in FIG. 6 does not constitute a limitation on the electronic device, and may include more or fewer components than those shown in the figure, or combine some components, or have different part arrangements. Details are not described herein again.

The user input unit 107 is configured to receive a first input, where the first input is an input that triggers an electronic device to be in a screen-off state; the processor 110 is configured to: in response to the first input received by the user input unit 107, turn off a screen of the electronic device; and the display unit 106 is configured to display a first screen-off display content on the turned-off screen of the processor 110, where the first screen-off display content is a content in a target application, the target application is a source application of a screen-off display content preset by a user in the electronic device, and the content in the target application is updated in real time after the screen of the electronic device is turned off.

In some implementations, the processor 110 is further configured to: before the user input unit 107 receives the first input, run the target application in a virtual screen of the electronic device to update the content in the target application in real time.

According to the electronic device in this embodiment of this application, since a running state of a virtual screen system of the electronic device is independent of a screen state of the electronic device, by running the target application in the virtual screen of the electronic device before the screen of the electronic device is turned off, it can be ensured that the target application can still run after the electronic device turns off the screen, so that the target application can be updated in real time.

In some implementations, the content in the target application is a content in a target interface of the target application, the processor 110 is further configured to: before the display module displays the first screen-off display content on the turned-off screen, acquire an image of the target interface to obtain a first screenshot image; and the display module is specifically configured to display the first screenshot image on the turned-off screen.

In some implementations, the first screen-off display content is a content in a target area of the target interface; the processor 110 is further configured to: before the display unit 106 displays the first screenshot image on the turned-off screen, perform a target operation on the first screenshot image to obtain a target image; and the display unit 106 is specifically configured to display the target image on the turned-off screen, where the target operation is any one of the following: acquiring an image corresponding to the target area in screenshot images; and covering an image other than the image corresponding to the target area in screenshot images.

In some implementations, the processor 110 is further configured to: after the display unit 106 displays the first screenshot image on the turned-off screen, re-acquires the image of the target interface every preset duration to obtain a second screenshot image; and the display unit 106 is further configured to update an image displayed on the turned-off screen with the second screenshot image.

In some implementations, the user input unit 107 is further configured to: before receiving the first input, receive a second input when the target interface is displayed; the display unit 106 is further configured to: in response to the second input received by the user input unit 107, display a target selection control; the user input unit 107 is further configured to: receive a third input to the target selection control displayed by the display unit 106, where the third input is used to trigger selection of the target area; and the processor 110 is configured to: in response to the third input received by the user input unit 107, set the target area as a source area of a screen-off display content of the electronic device.

In some implementations, the display unit 106 is further configured to display a screen-off display location editing interface before the user input unit 107 receives the first input, where the screen-off display location editing interface is used to set a display location of the screen-off display content on the turned-off screen; the user input unit 107 is further configured to receive a fourth input to an identifier of the target application in the screen-off display location editing interface displayed by the display unit 106; the processor 110 is configured to: in response to the fourth input received by the user input unit 107, set the display location of the content in the target application on the turned-off screen as a target display location, where the target display location is associated with an input parameter of the fourth input; and the display module is specifically configured to display the first screen-off display content on the target display location of the turned-off screen.

This embodiment of this application provides an electronic device. On the one hand, because the target application is the source application of the screen-off display content preset by the user in the electronic device, the user can set, according to actual use requirements, a content that the user wants to view after the screen of the electronic device is turned off; and on the other hand, because the content in the target application is updated in real time after the screen of the electronic device is turned off the content in the target application can be viewed in real time on the turned-off screen of the electronic device. In this way, the content displayed on the electronic device in a screen-off condition can be more flexible.

It should be noted that, in this embodiment of this application, the receiving module 501 in the schematic diagram (for example, FIG. 4) of a structure of the screen-off display apparatus can be realized by using the user input unit 107; the execution module 502 in the schematic diagram of a structure of the screen-off display apparatus and the setting module in the screen-off display apparatus can be realized by using the processor 110; and the display module 503 in the schematic diagram of a structure of the screen-off display apparatus can be realized by the display unit 106.

It should be understood that, in this embodiment of this application, the radio frequency unit 101 includes but is not limited to an antenna, at least one amplifier, a transceiver, a coupler, a low noise amplifier, a duplexer, and the like. The electronic device provides users with wireless broadband Internet access through the network module 102, for example, helps users receive and send e-mails, browse web pages, and access streaming media. The audio output unit 103 may include a speaker, a buzzer, a telephone receiver, and the like. The input unit 104 may include a Graphics Processing Unit (GPU) 1041 and a microphone 1042, and the graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. The processor 110 may be integrated with an application processor and a modem processor. The application processor mainly processes an operating system, a user interface, an application, and the like. The modem processor mainly processes wireless communication. It can be understood that, alternatively, the modem processor may not be integrated into the processor 110.

An embodiment of this application further provides a readable storage medium. The readable storage medium stores a program or an instruction, and when the program or the instruction is executed by a processor, the processes of the foregoing screen-off display method embodiment are implemented and a same technical effect can be achieved. To avoid repetition, details are not described herein again.

The processor is the processor in the electronic device in the foregoing embodiment. The readable storage medium may include a computer-readable storage medium such as a Read-Only Memory (ROM), a Random Access Memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes of the foregoing screen-off display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include," "comprise," or any other variant thereof is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may understand that the method in the foregoing embodiments may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A screen-off display method, comprising:
acquiring an image of a target interface of a target application to obtain a first screenshot image;
receiving a first input, wherein the first input is an input that triggers an electronic device to be in a screen-off state; and
in response to the first input, turning off a screen of the electronic device and displaying a first screen-off display content on the turned-off screen by displaying the first screenshot image on the turned-off screen, wherein the first screen-off display content is a content in the target application, the target application is a source application of a screen-off display content preset by a user in the electronic device, and the content in the target application is updated in real time after the screen of the electronic device is turned off.

2. The method according to claim 1, wherein before the receiving a first input, the method further comprises:
running the target application in a virtual screen of the electronic device to update the content in the target application in real time.

3. The method according to claim 1, wherein the first screen-off display content is a content in a target area of the target interface,
wherein before the displaying the first screenshot image on the turned-off screen, the method further comprises:
performing a target operation on the first screenshot image to obtain a target image,
wherein the displaying the first screenshot image on the turned-off screen comprises:
displaying the target image on the turned off screen, and
wherein the target operation is any one of the following:
acquiring an image corresponding to the target area in screenshot images; or
covering an image other than the image corresponding to the target area in screenshot images.

4. The method according to claim 1, wherein after the displaying the first screenshot image on the turned-off screen, the method further comprises:
re-acquiring the image of the target interface every preset duration to obtain a second screenshot image; and
updating an image displayed on the tamed-off screen with the second screenshot image.

5. The method according to claim 3, wherein before the receiving a first input, the method further comprises:
receiving a second input when the target interface is displayed;
displaying a target selection control in response to the second input;
receiving a third input to the target selection control, wherein the third input is used to trigger selection of the target area; and
in response to the third input, setting the target area as a source area of a screen-off display content of the electronic device.

6. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
acquiring an image of a target interface of a target application to obtain a first screenshot image;
receiving a first input, wherein the first input is an input that triggers the electronic device to be in a screen-off state; and
in response to the first input, turning off a screen of the electronic device and displaying a first screen-off display content on the turned-off screen by displaying the first screenshot image on the turned-off screen, wherein the first screen-off display content is a content in the target application, the target application is a source application of a screen-off display content preset by a user in the electronic device, and the content in the target application is updated in real time after the screen of the electronic device is turned off.

7. The electronic device according to claim 6, wherein before the receiving a first input, the operations further comprise:
running the target application in a virtual screen of the electronic device to update the content in the target application in real time.

8. The electronic device according to claim 6, wherein the first screen-off display content is a content in a target area of the target interface,
wherein before the displaying the first screenshot image on the turned-off screen, the operations further comprise:
performing a target operation on the first screenshot image to obtain a target image,
wherein the displaying the first screenshot image on the turned-off screen comprises:
displaying the target image on the turned-off screen, and
wherein the target operation is any one of the following:
acquiring an image corresponding to the target area in screenshot images; or
covering an image other than the image corresponding to the target area in screenshot images.

9. The electronic device according to claim 6, wherein after the displaying the first screenshot image on the turned-off screen, the operations further comprise:
re-acquiring the image of the target interface every preset duration to obtain a second screenshot image; and
updating an image displayed on the turned-off screen with the second screenshot image.

10. The electronic device according to claim 8, wherein before the receiving a first input, the operations further comprise:
receiving a second input when the target interface is displayed;
displaying a target selection control in response to the second input;
receiving a third input to the target selection control, wherein the third input is used to trigger selection of the target area; and
in response to the third input, setting the target area as a source area of a screen-off display content of the electronic device.

11. A non-transitory computer-readable medium storing instructions that, when executed by a processor, cause the processor to perform operations comprising:
acquiring an image of a target interface of a target application to obtain a first screenshot image;
receiving a first input, wherein the first input is an input that triggers an electronic device to be in a screen-off state; and
in response to the first input, turning off a screen of the electronic device and displaying a first screen-off display content on the turned off screen by displaying the first screenshot image on the turned-off screen, wherein the first screen-off display content is a content in the target application, the target application is a source application of a screen-off display content preset by a user in the electronic device, and the content in the target application is updated in real time after the screen of the electronic device is turned off.

12. The non-transitory computer-readable medium according to claim 11, wherein before the receiving a first input, the operations further comprise:
running the target application in a virtual screen of the electronic device to update the content in the target application in real time.

13. The non-transitory computer-readable medium according to claim 11, wherein the first screen-off display content is a content in a target area of the target interface, wherein before the displaying the first screenshot image on the turned-off screen, the operations further comprise:

performing a target operation on the first screenshot image to obtain a target image, wherein the displaying the first screenshot image on the turned off screen comprises:

displaying the target image on the turned-off screen, and wherein the target operation is any one of the following:

acquiring an image corresponding to the target area in screenshot images; or covering an image other than the image corresponding to the target area in screenshot images.

14. The non-transitory computer-readable medium according to claim 11, wherein after the displaying the first screenshot image on the turned-off screen, the operations further comprise:

re-acquiring the image of the target interface every preset duration to obtain a second screenshot image; and updating an image displayed on the turned-off screen with the second screenshot image.

15. The non-transitory computer-readable medium according to claim 13, wherein before the receiving a first input, the operations further comprise:

receiving a second input when the target interface is displayed;

displaying a target selection control in response to the second input;

receiving a third input to the target selection control, wherein the third input is used to trigger selection of the target area; and in response to the third input, setting the target area as a source area of a screen-off display content of the electronic device.

* * * * *